Aug. 18, 1925.
J. R. GAMMETER
1,549,762
PNEUMATIC TIRE CONSTRUCTION
Filed April 2, 1923
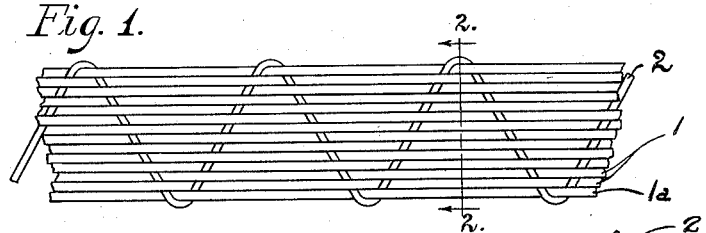
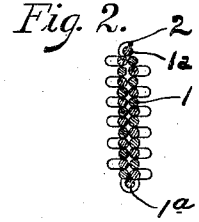
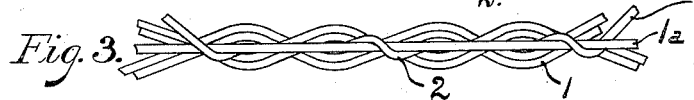
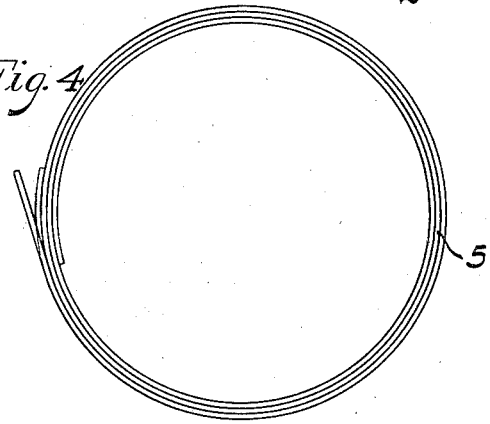
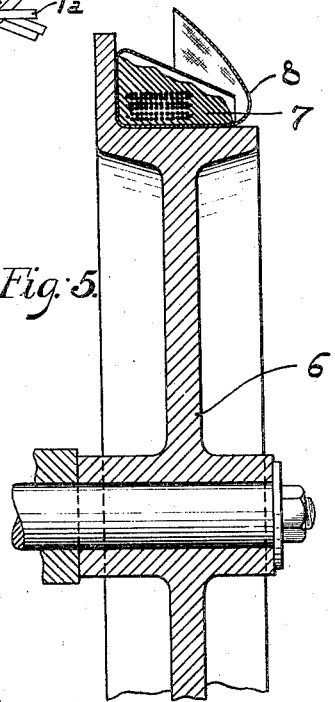
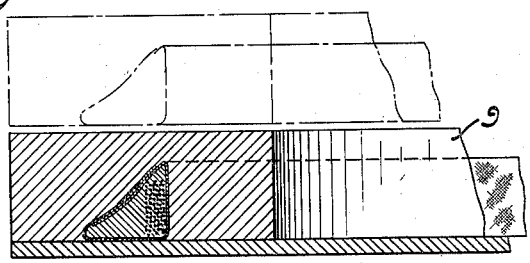
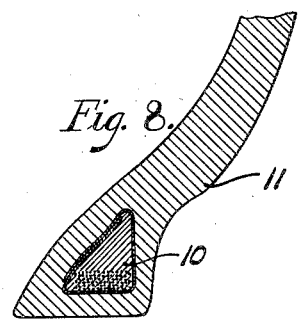
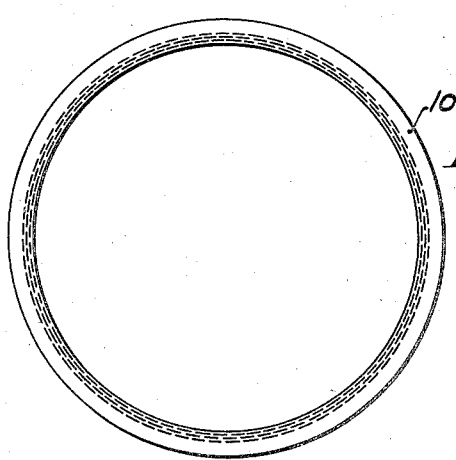
Inventor
John R. Gammeter.
By
Atty.

Patented Aug. 18, 1925.

1,549,762

UNITED STATES PATENT OFFICE.

JOHN R. GAMMETER, OF AKRON, OHIO, ASSIGNOR TO THE AMERICAN CHAIN COMPANY, OF BRIDGEPORT, CONNECTICUT, A CORPORATION OF CONNECTICUT.

PNEUMATIC-TIRE CONSTRUCTION.

Application filed April 2, 1923. Serial No. 629,248.

*To all whom it may concern:*

Be it known that I, JOHN R. GAMMETER, a citizen of the United States, and a resident of Akron, county of Summit, State of Ohio, have invented certain new and useful Improvements in Pneumatic-Tire Construction, of which the following is a specification.

This invention relates to the construction of pneumatic tires of that type having inextensible beads, known as straight-side tires. The invention relates particularly to the reinforcement used in the beads to impart strength and inextensibility thereto. The form of reinforcement shown herein is designed to replace the usual or well-known braided wire tape and is superior to that form of tape in strength and non-stretchability, as well as being cheaper and easier to manufacture. The present design of reinforcement is designed to impart greater strength to the bead than prior forms of reinforcement and to be rigid transversely of the tape so that the tape cannot be distorted by mold pressure.

These and other objects will be apparent from the drawings and description of the improved pneumatic tire construction, it being obvious that exact adherence to details of construction is not necessary, as modifications and variations are possible within the scope of the invention.

In the drawings:

Figure 1 is a plan view of a portion of the tire reinforcement;

Fig. 2 is a section on the line 2—2 of Fig. 1;

Fig. 3 is a side elevation of the wire;

Fig. 4 is a side view of the wire reinforcement as assembled in ring form preparatory to incorporation in the bead;

Fig. 5 is a view of the forming ring on which the bead is constructed;

Fig. 6 is a view of the bead in the process of semi-curing in preparation for its incorporation in the tire;

Fig. 7 is a view of the bead ring; and

Fig. 8 is a fragment of the tire casing with the bead located therein.

The pneumatic tire construction herein shown and described is an improvement over certain prior constructions, particularly as an improvement on the reinforcing element for tire beads shown in the application of one Robert C. Pierce, Serial No. 628,688, filed March 30, 1923. The present construction is designed to afford greater tensile strength than the form of wire shown in said application, without increasing the difficulty of weaving the wire.

The wire reinforcement is shown in Figs. 1, 2 and 3, and comprises a double layer of longitudinal wires 1 placed one above the other as shown in Fig. 2. The outer wires 1a may be single if desired and may be of greater tensile strength than the inner wires. The wires are held in parallel position in the form of a tape by a single crossing wire 2 woven back and forth from edge to edge of the tape and passing over and under alternate pairs of longitudinal wires. The weaving of this tape is easily accomplished by threading two longitudinal wires through each heddle of an ordinary weaving machine, such as used, for example, in the weaving of ribbon or narrow stock. It will be noted that the wires are placed in substantial contact across the width of the tape, or with what may be termed "zero spacing" and that thereby the tape is held in more rigid relation than is true of the ordinary braided tape or tape which is woven more openly.

It will be noted that where the outer or selvage wires 1a are of greater tensile strength than the inner wires they tend to remain straight, while the wire 2, which may be lighter in gage than the longitudinal wires, serves to form the longitudinal wires into waves or undulations, so that the surfaces of the tape are undulatory. This gives the tape an increased grip or holding effect on the rubber or rubber composition of the bead, the rubber finding its way into the many interstices caused by the crossing wire and thus locking securely with the wire reinforcement.

In the manufacture of the tire, the wire reinforcement may or may not be insulated or coated with rubber before it is wound with the suitable number of convolutions prior to its incorporation in the bead. A wire reinforcement 5 is shown in Fig. 4, being shown as wrapped in three convolutions. Such a reinforcement may be mounted on a forming wheel or drum 6 and surrounded by a mass of rubber or rubber composition 7 and covered by a fabric envelope or cover 8. The bead so built up is transferred to a mold 9 where it is given a preliminary or partial vulcanization, being then in the form shown at 10 in Fig. 7.

The bead is then ready to be incorporated in the lower edge of a tire casing 11 in which position the tape is parallel to the base of the bead.

By providing two or a plurality of layers of longitudinal wires in the tape as shown, an increased tensile strength is afforded with a single weaving operation. The extent of undulations in the tape is increased and the interstices for the rubber compound are greater in number than with previous constructions. While two wires only in layers are shown, it is apparent that the number of wire layers may be increased as desired without departing from the advantages of the invention. Other changes may be made as desired within the scope of the appended claims.

What I claim is:

1. In a tire construction, a bead and a reinforcement located in said bead and adapted to impart inextensibility thereto, said reinforcement comprising a substantially flat tape including a plurality of longitudinal wires arranged across said tape in a plurality of layers and a crossing wire passing back and forth from edge to edge of said tape and adapted to hold the wires in the form of a tape.

2. In a tire construction, a bead and a reinforcement located in said bead and adapted to strengthen the same, said reinforcement comprising a plurality of longitudinal wires arranged across said tape in side contact with one another and in two layers, and a crossing wire passing back and forth from edge to edge of said tape and over and under pairs of longitudinal wires.

3. In a tire construction, a bead and a reinforcement located in said bead, said reinforcement comprising a plurality of parallel longitudinal wires in contact across said tape and in two layers, and a crossing wire passing back and forth from edge to edge of said tape and over and under pairs of longitudinal wires and serving to form undulations in the surfaces of the reinforcement.

4. In a tire construction, a tire bead substantially triangular in cross-section and comprising a reinforcing tape parallel to the base of the bead and a filling of rubber composition surrounding the reinforcement and vulcanized thereto, said reinforcement comprising a plurality of layers of parallel wires, and a crossing wire woven from edge to edge thereof and serving to maintain the wires in the form of a tape, said crossing wire passing over and under pairs of longitudinal wires.

5. In a tire construction, a tire bead substantially triangular in cross-section and comprising a reinforcing tape parallel to the base of the bead, and a filling of rubber composition surrounding the reinforcement and vulcanized thereto, said reinforcement comprising a plurality of layers of parallel wires, and a crossing wire woven from edge to edge thereof and serving to maintain the wires in the form of a tape, said crossing wire passing over and under pairs of longitudinal wires and forming undulatory surfaces on the wire tape thereby multiplying the interstices within the tape.

6. In a tire bead construction, a reinforcement comprising a plurality of parallel wires in layers to form a substantially flat tape, single wires at the edges of the tape, and a crossing wire to hold said parallel wires in position.

JOHN R. GAMMETER.